US012801075B2

(12) United States Patent
Yasukawa et al.

(10) Patent No.: US 12,801,075 B2
(45) Date of Patent: Nov. 17, 2026

(54) IMAGE FORMING SYSTEM

(71) Applicant: CANON KABUSHIKI KAISHA, Tokyo (JP)

(72) Inventors: Takuma Yasukawa, Chiba (JP); Yasuo Hirouchi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 18/809,769

(22) Filed: Aug. 20, 2024

(65) Prior Publication Data

US 2025/0068116 A1 Feb. 27, 2025

(30) Foreign Application Priority Data

Aug. 22, 2023 (JP) ................................. 2023-134575

(51) Int. Cl.
*G03G 15/00* (2006.01)

(52) U.S. Cl.
CPC ......... *G03G 15/6585* (2013.01); *G03G 15/50* (2013.01); *G03G 15/5016* (2013.01); *G03G 15/502* (2013.01); *G03G 15/6508* (2013.01); *G03G 15/6582* (2013.01); *G03G 15/70* (2013.01); *G03G 2215/00666* (2013.01)

(58) Field of Classification Search
CPC ........... G03G 15/6582; G03G 15/6585; G03G 15/50; G03G 15/502; G03G 15/5016; G03G 15/6508; G03G 15/70; G03G 2215/00666
See application file for complete search history.

(56) References Cited

U.S. PATENT DOCUMENTS

2012/0141154 A1* 6/2012 Yoshida ................. G03G 21/00 399/69
2016/0167417 A1* 6/2016 Sasaki .................. B41M 7/0009 347/179
2018/0181035 A1* 6/2018 Hashimoto .......... G03G 15/205

FOREIGN PATENT DOCUMENTS

JP 2015166886 A 9/2015
JP 2018072809 A 5/2018

* cited by examiner

*Primary Examiner* — Joseph S Wong
(74) *Attorney, Agent, or Firm* — Canon U.S.A., Inc. IP Division

(57) ABSTRACT

An image forming system including an image forming apparatus including a reception unit configured to receive a decolorable printing job to execute decolorable printing processing using a decolorable recording material on which a decolored character is to be expressed at a temperature lower than a predetermined temperature, includes a notification unit configured to provide information, and a controller configured to obtain temperature information, wherein, in a case where the decolorable printing job is executed, the notification unit provides a notification of a warning against execution of the decolorable printing job based on the temperature information indicating a temperature at which the decolored character can be expressed.

14 Claims, 21 Drawing Sheets

FIG. 5

500

| | |
|---|---|
| MINIMUM UTILIZATION TEMPERATURE | 10°C |
| EXPRESSION WARNING TEMPERATURE | 10 - X°C |

501

FIG. 6

600

| | |
|---|---|
| INSTALLATION SITE | OTA WARD, TOKYO |

FIG. 7

700

| | | |
|---|---|---|
| TAKE-OUT DESTINATION 1 | SAPPORO CITY, HOKKAIDO | 701 |
| TAKE-OUT DESTINATION 2 | SUSONO CITY, SHIZUOKA PREFECTURE | 702 |

FIG. 10

1000

| | |
|---|---|
| TEMPERATURE DETERMINATION TIME | 17:00 EVERYDAY |
| RESULT NOTIFICATION RANGE | 10 HOURS BEFORE EXECUTION |

FIG. 11

1100

| JOB MANAGEMENT NUMBER (1101) | EXECUTION DATE/TIME (1102) | USER NAME (1103) | JOB TYPE (1104) | EXECUTION RESULT (1105) | DECOLORABLE PRINTING (1106) |
|---|---|---|---|---|---|
| 0008 | 2023/01/25 15:00 | USER A | PRINT | OK | YES |
| 0007 | 2023/01/25 14:00 | USER C | COPY | OK | YES |
| 0006 | 2023/01/25 10:00 | USER A | FAX TRANSMISSION | OK | NO |
| 0005 | 2023/01/25 9:00 | USER B | PRINT | NG | YES |
| 0004 | 2023/01/25 8:00 | USER C | PRINT | OK | YES |
| 0003 | 2023/01/24 19:00 | USER A | PRINT | OK | YES |

FIG. 13

1300

| | |
|---|---|
| TEMPERATURE DETERMINATION TIME ZONE | 23:00 TO 05:00 |
| TEMPERATURE DETERMINATION TIME | EVERY HOUR |
| RESULT NOTIFICATION TIME | 08:00 EVERYDAY |

IMAGE FORMING SYSTEM

BACKGROUND

Field of the Disclosure

The present disclosure relates to an image forming system.

Description of the Related Art

In recent years, along with the increase of environmental awareness, there has been an increasing demand for reusing paper having been printed on an image forming apparatus. In this regard, an image forming apparatus that supports not only printing with normal toner, but also printing with decolorable toner that enables reuse of printed paper is known (e.g., Japanese Patent Application Laid-Open No. 2018-072809).

A decoloring apparatus is used to process paper printed with decolorable toner to decolor an image formed with the decolorable toner, thereby enabling a user to reuse the printed paper. As a color material for decolorable toner, encapsulated coloring particles including a color developable compound, a developer, and a decolorant are used. The coloring particles have such characteristics that the particles are decolored when heated to a first temperature or higher, and develops color when cooled to a temperature lower than or equal to a second temperature that is lower than the first temperature after being decolored (e.g., see Japanese Patent Application Laid-Open No. 2015-166886).

SUMMARY

According to an aspect of the present disclosure, an image forming system including an image forming apparatus including a reception unit configured to receive a decolorable printing job to execute decolorable printing processing using a decolorable recording material on which a decolored character is to be expressed at a temperature lower than a predetermined temperature, includes a notification unit configured to provide information, and a controller configured to obtain temperature information, wherein, in a case where the decolorable printing job is executed, the notification unit provides a notification of a warning against execution of the decolorable printing job based on the temperature information indicating a temperature at which the decolored character can be expressed.

Further features of the present disclosure will become apparent from the following description of exemplary embodiments with reference to the attached drawings.

BRIEF DESCRIPTION OF THE DRAWINGS

FIG. 5 illustrates an example of a minimum utilization temperature setting.

FIG. 6 illustrates an example of an installation site.

FIG. 7 illustrates an example of a take-out destination setting.

FIG. 10 illustrates an example of a user notification schedule.

FIG. 11 illustrates an example of a job history.

FIG. 13 illustrates an example of a user notification schedule.

DESCRIPTION OF THE EMBODIMENTS

Exemplary embodiments of the present disclosure will be described in detail with reference to the accompanying drawings. The following exemplary embodiments are not intended to limit the scope of the claimed disclosure, and not all combinations of features described in the exemplary embodiments are necessarily deemed to be essential. In the following exemplary embodiments, an image forming apparatus will be described as an example of an information processing apparatus. However, the present disclosure is not limited to this example.

An image adjustment and user notification in a main body of an image forming apparatus 102 will be described below with reference to FIG. 1.

Figure 1:
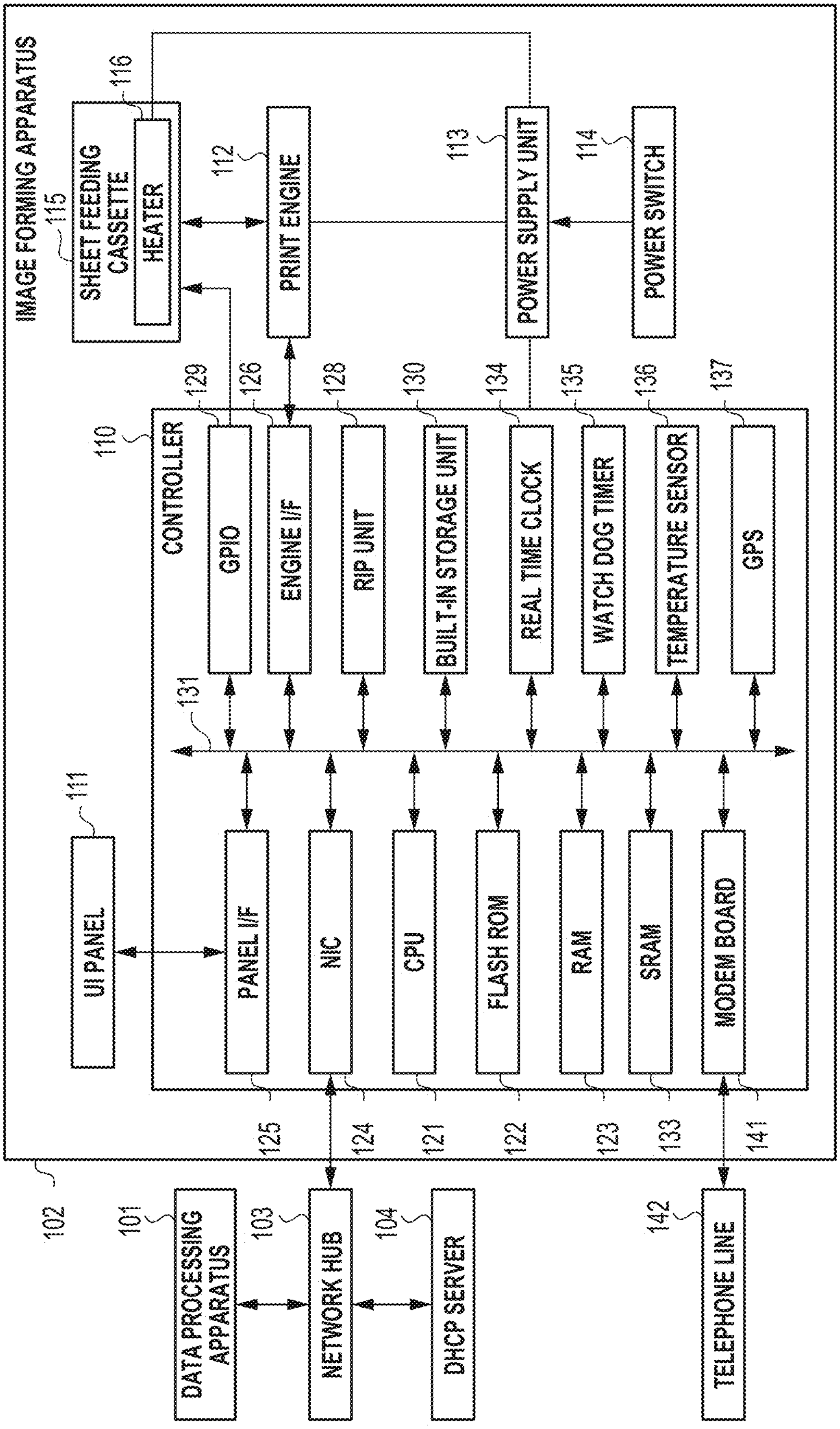
FIG. 1 is a block diagram illustrating a configuration example of an image forming apparatus.

FIG. 1 is a block diagram schematically illustrating a configuration of the image forming apparatus 102 according to a first exemplary embodiment.

As illustrated in FIG. 1, the image forming apparatus 102 is connected to a data processing apparatus 101 and a dynamic host configuration protocol (DHCP) server 104 via a network hub 103.

The network hub 103 is a hub for establishing a network communication among the data processing apparatus 101, the image forming apparatus 102, and the DHCP server 104. In the first exemplary embodiment, a local network configuration in which the data processing apparatus 101, the image forming apparatus 102, and the DHCP server 104 are connected to a single network hub 103 is described. However, the first exemplary embodiment is not limited to this configuration. For example, another network configuration using a plurality of network hubs may be used.

The data processing apparatus 101 is, for example, a personal computer (PC). The data processing apparatus 101 generates print description language (PDL) data and transmits the PDL data to the image forming apparatus 102 as a print job. The data processing apparatus 101 transmits compressed data or the like to update firmware for the image forming apparatus 102 in processing of updating the firmware for the image forming apparatus 102. In the case of transmitting a print job from the data processing apparatus 101 to the image forming apparatus 102, the data processing apparatus 101 transmits the job via a print driver to the image forming apparatus 102.

The DHCP server 104 is a server that receives a network setting information obtaining request based on a DHCP and returns network setting information.

The image forming apparatus 102 is, for example, a laser printer. The image forming apparatus 102 receives PDL data from the data processing apparatus 101, and forms an image on a sheet based on the received image data. The image forming apparatus 102 may be a multifunction peripheral including a plurality of functions, such as a copy function, a scanner function, and a facsimile (FAX) function. The image forming apparatus 102 includes a controller 110, a user interface (UI) panel 111, a print engine 112, a power supply unit 113, and a power switch 114.

The controller 110 is a controller board that generates bitmap data for printing based on the PDL data received from the data processing apparatus 101, and transmits the bitmap data to the print engine 112. To print settings relating to the image forming apparatus 102 or the state of the image forming apparatus 102 as a report, the controller 110 itself may generate PDL data and issue a print instruction.

The UI panel 111 is a user interface that may include a display unit (not illustrated) to transmit various kinds of information to a user, and an operation unit (not illustrated) to receive various operations from the user. For example, the UI panel 111 may include not only physical buttons, but also a touch panel or the like.

The image forming apparatus 102 may include a function for lighting or blinking a light-emitting diode (LED) of the UI panel 111 to inform the user of an error that has occurred in the image forming apparatus 102, or a warning. The image forming apparatus 102 may further include a function for outputting a warning sound from a buzzer or the like of the UI panel 111 to inform the user of an error that has occurred in the image forming apparatus 102, or a warning.

The print engine 112 is a print engine for forming an image on a sheet using an electrophotographic method based on the bitmap data received from the controller 110. As the image forming method, not only the electrophotographic method using toner as a recording material, but also, for example, an inkjet method using ink as a recording material may be used. In this case, "output toner type", "normal toner", and "decolorable toner" are read as "output ink type", "normal ink", and "decolorable ink", respectively.

The print engine 112 may include a plurality of color recording materials and may be configured to perform color printing. A decoloring function can be provided as a function of the image forming apparatus 102, or as a function of an independent apparatus. In general, it is difficult for the decoloring function to restore a printed sheet to a completely blank sheet. If a toner image formed on the sheet has a high density, the image cannot be decolored, and the color may remain. If an image printing ratio is high, or if there is a large image to be printed, it may be difficult to use the decoloring function as expected.

In the present exemplary embodiment, the print engine 112 includes a function for switching an output toner type to be used for forming an image on a sheet according to an instruction from the controller 110 between normal toner (non-decolorable toner) and decolorable toner. The print engine 112 also includes a function for adjusting an image forming process including a sheet conveyance speed and a fixing temperature based on the output toner type. For example, the fixing temperature is switched between printing with normal toner and printing with decolorable toner. In the case of performing printing with decolorable toner, the print engine 112 records a mark with which the number of times of printing with decolorable toner can be discriminated on the outside of a print target area on a sheet to be printed. In the present exemplary embodiment, execution of printing processing using decolorable toner is referred to as decolorable printing processing. A printed material obtained by executing the decolorable printing processing can be reused by heating the sheet at a predetermined temperature to make an image printed with decolorable toner invisible to the user. The predetermined temperature is, for example, a temperature higher than the fixing temperature during printing.

The power supply unit 113 is a power supply unit for supplying power to each component that constitutes the image forming apparatus 102. The power supply unit 113 functions to generate a voltage for operating each part and supply the voltage. The power switch 114 is a switch for receiving a power-on instruction or a power-off instruction from the user. For example, in a case where the image forming apparatus 102 is in a power-off state, when the user presses the power switch 114, a notification about an event of pressing the power switch 114 is transmitted to the power supply unit 113. The power supply unit 113 starts to supply power to each part that constitutes the image forming apparatus 102.

The controller 110 includes a central processing unit (CPU) 121, a flash read-only memory (ROM) 122, a random access memory (RAM) 123, a static RAM (SRAM) 133, a network interface controller (NIC) 124, and a panel interface (I/F) 125. The controller 110 further includes an engine I/F 126, a raster image processor (RIP) unit 128, a built-in storage unit 130 serving as a storage, and a real time clock 134. The controller 110 also includes a watch dog timer 135. The controller 110 also includes a modem board 141 for establishing communication via a telephone line 142. The controller 110 also includes a bus 131 for connecting these components.

The CPU 121 is a central processing unit that executes various programs to thereby control the image forming apparatus 102. The flash ROM 122 is a nonvolatile memory that holds an initial program to be executed upon reset release of the CPU 121. The RAM 123 is a volatile memory that temporarily stores information for the CPU 121 to run various programs. The SRAM 133 is a volatile memory that holds data when the image forming apparatus 102 is in an energized state.

The NIC 124 is a network interface controller for interconnecting devices on the outside of the image forming apparatus 102 via a network and relaying bidirectional data communication or data transmission and reception. In the present exemplary embodiment, the image forming apparatus 102 may include a communication unit that establishes wireless connection in addition to a communication unit that establishes wired connection.

The panel I/F 125 is an interface for interconnecting the UI panel 111 and the controller 110 and relaying bidirectional data communication, i.e., data transmission and reception.

The engine I/F 126 is an interface that interconnects the print engine 112 and the controller 110 and relays bidirectional data communication, i.e., data transmission and reception.

The RIP unit 128 converts intermediate data into bitmap data and loads the bitmap data into the RAM 123. While the present exemplary embodiment illustrates a configuration in which the RIP unit 128 that is independent of the CPU 121 and is exclusively used converts intermediate data into bitmap data, the image forming apparatus 102 need not necessarily include the RIP unit 128. In the configuration in which the image forming apparatus 102 does not include the RIP unit 128, the CPU 121 performs processing for converting PDL data received from the data processing apparatus 101 into bitmap data.

The built-in storage unit 130 is a nonvolatile storage device that holds an operating system (OS) to be started from the initial program. The built-in storage unit 130 is, for example, an embedded MultiMediaCard (eMMC), a hard disk, or a solid-state drive. A large-capacity storage area can be secured at a relatively low cost for the built-in storage unit 130. Accordingly, the built-in storage unit 130 stores an OS program and data to be used for the OS. The built-in storage unit 130 can also be used for a reservation printing function for holding a received print job and executing printing after adjusting image quality and image density.

The real time clock 134 is a hardware chip for managing time information inside the image forming apparatus 102 in a nonvolatile manner. The real time clock 134 is driven with power supplied from a battery that is a power supply independent of the power supply unit 113, and thus can periodically update the time information even after the image forming apparatus 102 is powered off.

The modem board 141 is a board for transmitting and receiving a FAX job, which is one of received print jobs, to and from a FAX apparatus of the image forming apparatus 102 via the telephone line 142.

A temperature sensor 136 is a sensor for measuring a temperature at a location where the image forming apparatus 102 is used. The temperature sensor 136 may be exposed on an exterior surface of the image forming apparatus 102 so as to mainly prevent the temperature sensor 136 from being thermally influenced by the print engine 112.

A global positioning system (GPS) 137 is configured to identify the location where the image forming apparatus 102 is used by a GPS function.

A sheet feeding cassette 115 stores normal printing sheets and decolored printing sheets. A heater 116 is included in the sheet feeding cassette 115. The heater 116 is configured to keep the sheets warm so as to prevent a decolored print content on each decolored printing sheet from appearing again when the room temperature is expected to drop to a temperature lower than or equal to a predetermined temperature. Power is supplied to the heater 116 via a line of a system different from that of the print engine 112. Controlling of activation and stopping of the heater 116 is performed under control of the CPU 121 via a line using a General Purpose Input/Output (GPIO) 129.

Figure 2:
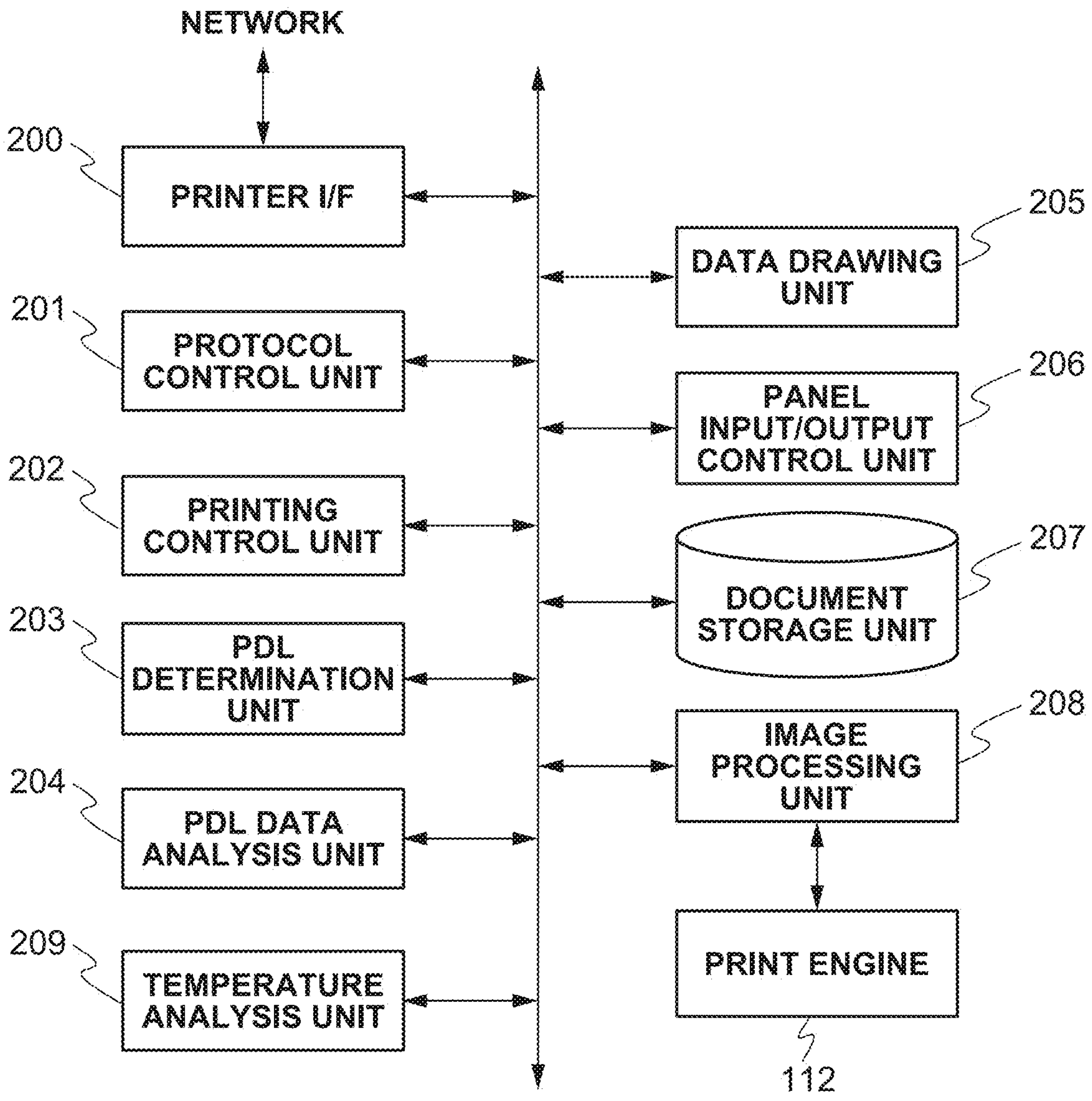
FIG. 2 is a block diagram illustrating a configuration example of controller software.

FIG. 2 is a block diagram illustrating a configuration of controller software for controlling operation of the image forming apparatus 102. A printer I/F 200 is a unit for controlling input to and output from an external apparatus via the NIC 124. A protocol control unit 201 is a unit for communicating with an external apparatus by analyzing and transmitting a network protocol. The printer I/F 200 receives PDL data transmitted from an external network and stores the PDL data in a document storage unit 207. A printing control unit 202 allows the CPU 121 to perform processing for activating a PDL determination unit 203 and a PDL analysis unit 204 with regard to the PDL data received by the document storage unit 207.

The PDL determination unit 203 allows the CPU 121 to analyze the PDL data according to an instruction from the printing control unit 202 to thereby determine types of PDL and file format. The PDL analysis unit 204 is a unit for allowing the CPU 121 to analyze PDL data selected by the PDL determination unit 203 and convert the PDL data into intermediate data (display list) in a format that is more easily processed for each drawing object.

Examples of the drawing object include a character (text object), a figure (graphics object), and a photo (image object). The intermediate data generated by the PDL analysis unit 204 is delivered to a data drawing unit 205 via the document storage unit 207 and is processed therein.

The data drawing unit 205 allows the RIP unit 128 to generate bitmap data based on the intermediate data stored in the document storage unit 207, and the generated bitmap data is sequentially drawn in the document storage unit 207. A temperature analysis unit 209 allows the CPU 121 to determine whether the temperature at a specific site is appropriate as an environment for handling decolorable toner according to an instruction from the printing control unit 202.

Figure 3:
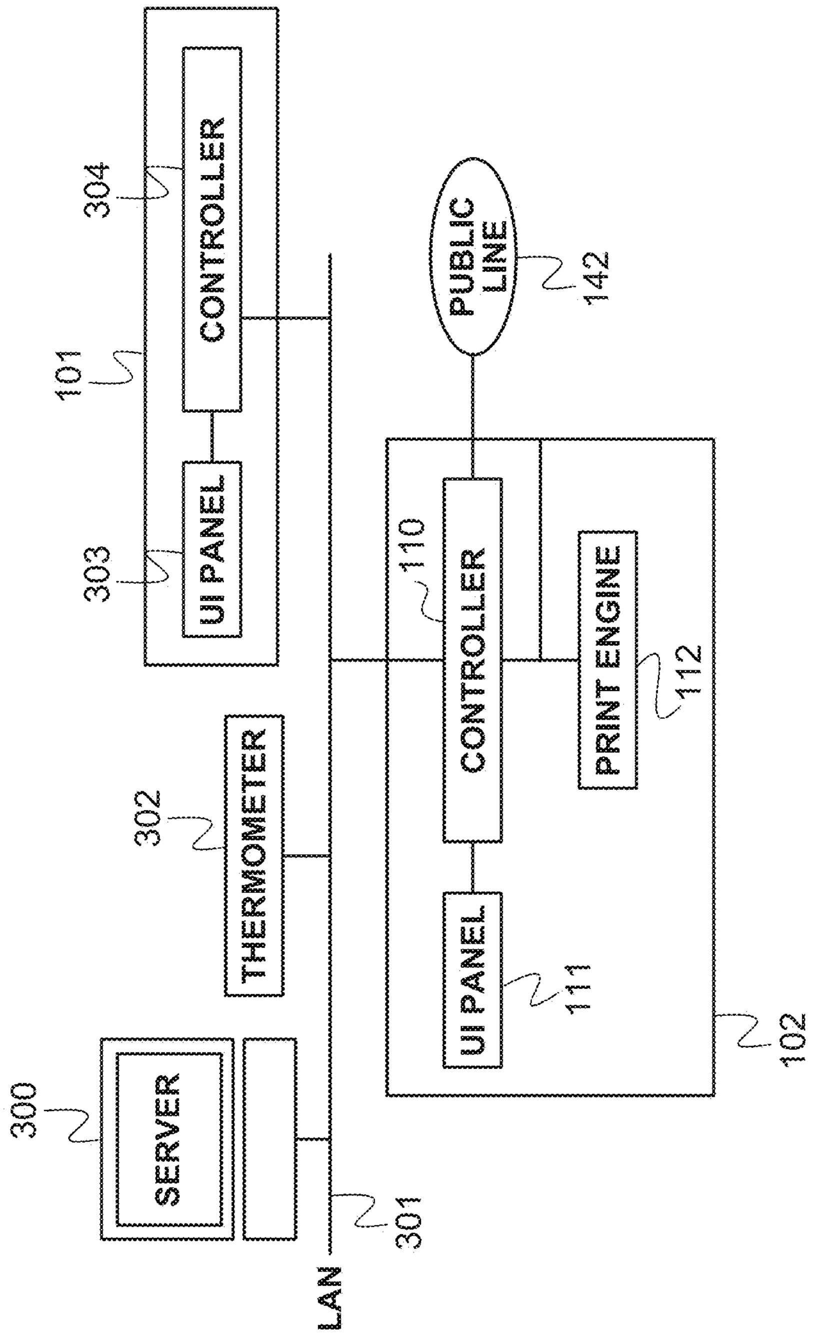
FIG. 3 is a block diagram illustrating a configuration of an image forming system including a server.

FIG. 3 is a block diagram illustrating a configuration of an image forming system according to the present exemplary embodiment. In the image forming system, a server 300 (information processing apparatus) and the image forming apparatus 102 can communicate with each other via a network (local area network (LAN) 301). In the image forming system according to the present exemplary embodiment, the number of information processing apparatuses to be connected is not particularly limited to the above. In the present exemplary embodiment, a LAN is used as a connection method. However, the connection method is not limited to the LAN. For example, any network such as a wide area network (WAN) (public line 142), a serial transmission method such as a universal serial bus (USB), or a parallel transmission method such as centronics or Small Computer System Interface (SCSI) can also be used.

The server 300 includes a PC function. The server 300 includes hardware modules (not illustrated), such as a CPU, a RAM, a ROM, a hard disk drive (HDD), an input device such as a keyboard and a mouse, an output device such as a display, and a network I/F, and a chip set for controlling these modules. These hardware modules are interconnected with an internal data bus. A Basic Input/Output System (BIOS) and an OS operate as software for controlling these hardware modules. The server 300 is configured to transmit and receive files using a file transfer protocol (FTP) or a server message block (SMB) protocol via the LAN 301 or WAN, and to transmit and receive electronic mails (e-mails).

A thermometer 302 is a measuring apparatus for measuring an outside air temperature or a room temperature. The server 300 can obtain the temperature based on a weather forecast or a measured value at a specific site via the LAN 301.

The image forming apparatus 102 includes the print engine 112 that is an image output device, the controller 110 that controls the overall operation of the image forming apparatus 102, and the UI panel 111.

The data processing apparatus 101 (information processing apparatus) includes a UI panel 303 and a controller 304. The controller 304 includes a CPU, a nonvolatile storage, and a RAM, which are not illustrated. The data processing apparatus 101 can transmit a print job (decolorable printing job) to the image forming apparatus 102.

Figure 4:
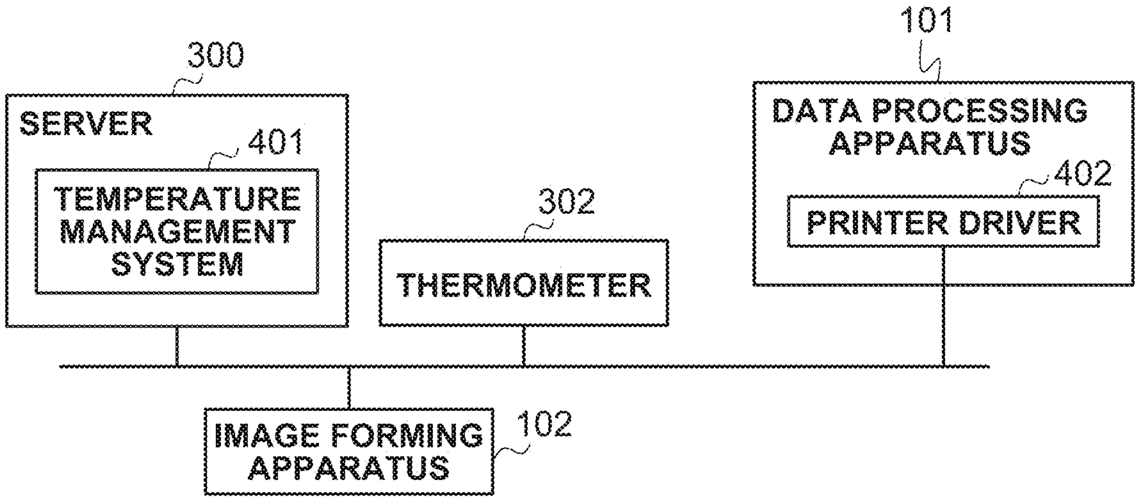
FIG. 4 is a block diagram illustrating a software configuration example of the server.

FIG. 4 schematically illustrates a functional configuration in the server 300 to perform processing upon reception of a request from the image forming apparatus 102 that is directly connected to the server 300 or is connected to the server 300 via a network. A temperature management system 401 periodically or sequentially obtains a temperature at a specific location from the thermometer 302. The printer driver 402 is an application for generating a print job.

Upon receiving a temperature obtaining request at a desired site from the image forming apparatus 102, the temperature management system 401 transmits a notification about the temperature obtained from the thermometer 302 to the image forming apparatus 102.

FIG. 5 illustrates an example of a minimum utilization temperature setting for the image forming apparatus 102. In this example, the minimum temperature is 10° C. A minimum utilization temperature 500 is preliminarily held in the image forming apparatus 102, but instead may be changed by the user. An expression warning temperature 501 indicates that a decolored content is unfailingly expressed at a temperature lower than a designated temperature. "X" represents a positive value, and 10-X° C. indicates a temperature lower than 10° C. The minimum utilization temperature 500 and the expression warning temperature 501 are stored in the built-in storage unit 130.

FIG. 6 illustrates an example of an installation site setting for the image forming apparatus 102. FIG. 6 illustrates installation site information 600 indicating that the image forming apparatus 102 is located in Ota Ward, Tokyo. Based on the setting, the image forming apparatus 102 requests the server 300 to obtain the temperature. The installation site setting may be made such that information is input by the user or an administrator upon installation, or information identified from the GPS 137 may be automatically input. The installation site information 600 is stored in the built-in storage unit 130.

FIG. 7 illustrates an example of take-out destination candidates for output sheets. In take-out destination information 700 illustrated in FIG. 7, as the take-out destination candidates for an output material from the image forming apparatus 102, information 701 indicating Sapporo City, Hokkaido is set as a take-out destination 1 and information 702 indicating Susono City, Shizuoka Prefecture is set as a take-out destination 2. Setting of the take-out destination candidate may be made such that take-out destination candidates are registered for the image forming apparatus 102 as in this example, are registered for each user, or are registered for each job. Hereinafter, the term "job" refers to a print job.

Figure 8:
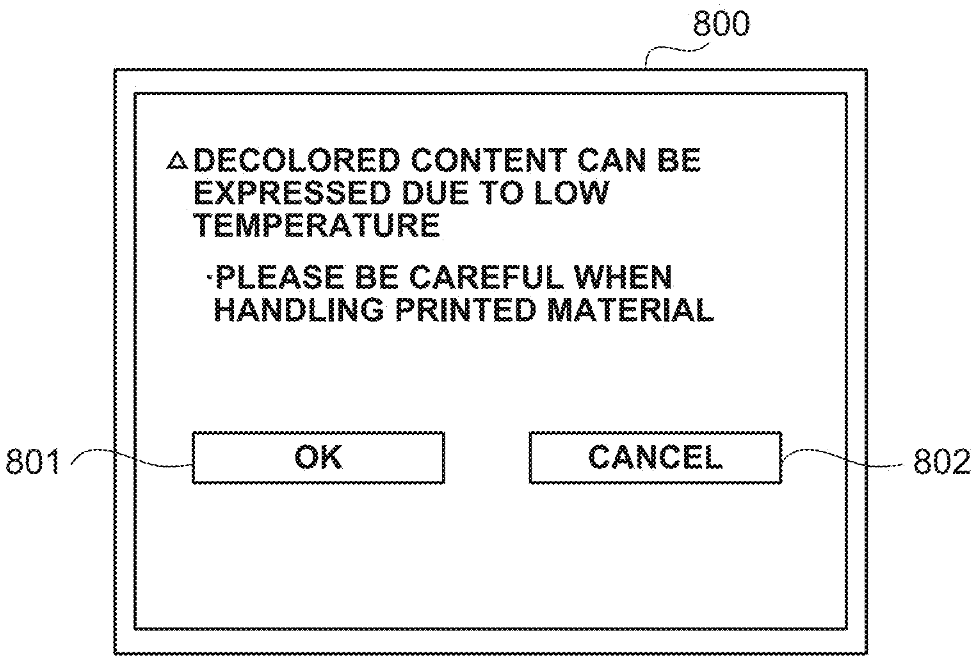
FIG. 8 illustrates an example of a user notification screen.

FIG. 8 illustrates an example of a user notification screen based on a temperature determination result. In the present exemplary embodiment, for example, if a job is received, temperature determination is performed. If a temperature determination result indicates that the obtained temperature is lower than the prescribed minimum utilization temperature 500, a warning screen 800 indicating that there is a risk of a decolored content being expressed due to a low temperature is displayed as a notification. When the user presses an OK button 801 (first key), the decolorable printing job is executed. When the user presses a cancel button 802 (second key), the decolorable printing job is cancelled or suspended. The display of the cancel button 802 can be omitted. Similarly, the display of the OK button 801 can be omitted.

Figure 9:
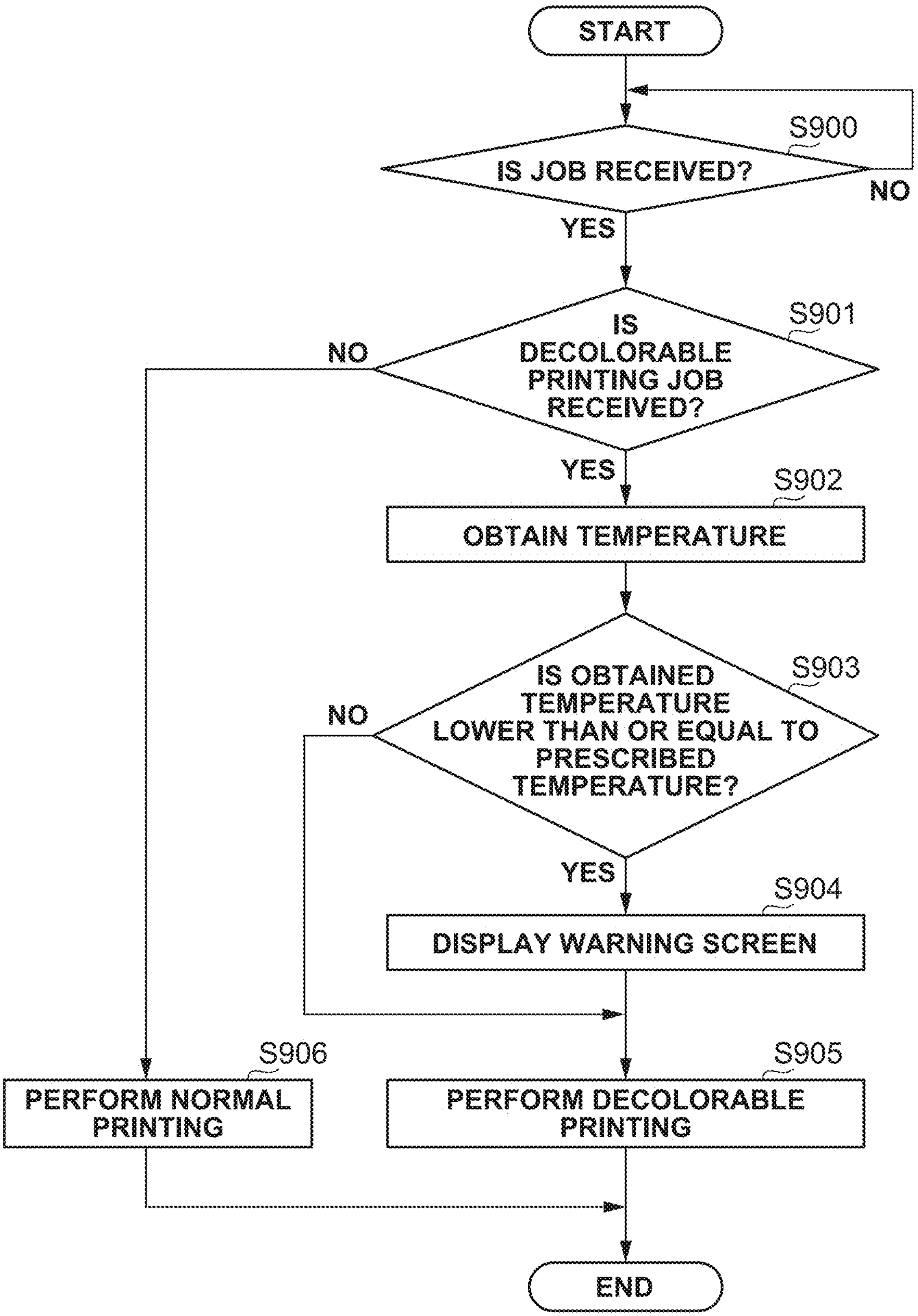
FIG. 9 illustrates an example of a control flowchart for image adjustment and user notification.

FIG. 9 illustrates an example of a control flowchart for obtaining a temperature and notifying the user thereof performed in the main body of the image forming apparatus 102. The image forming apparatus 102 receives a job from the user, and the CPU 121 causes the temperature analysis unit 209 to analyze the temperature.

In step S900, the CPU 121 determines whether a job is received. If the CPU 121 determines that a job is received (YES in step S900), the processing proceeds to step S901.

Examples of a configuration for receiving a job include a configuration for receiving a print job from the data processing apparatus 101 via the NIC 124, a configuration for receiving a copy job via the UI panel 111, and a configuration for receiving a FAX job via the modem board 141.

In step S901, the CPU 121 causes an image processing unit 208 to check whether the print job is a decolorable printing job. If the CPU 121 determines that the print job is a decolorable printing job (YES in step S901), the processing proceeds to step S902. If the CPU 121 determines that the print job is not a decolorable printing job (NO in step S901), the processing proceeds to step S906. Specifically, it is checked whether print job parameters include a setting value for decolorable printing.

In step S902, the CPU 121 causes the temperature analysis unit 209 to obtain the temperature on the utilization site. For example, the CPU 121 requests the server 300 to obtain the temperature based on the installation site information 600. The server 300 returns temperature information at that time in the location indicated by the installation site information 600.

Further, the CPU 121 may obtain temperature information on a plurality of sites based on the take-out destination information 700. While, in the present exemplary embodiment, an example where the temperature information is obtained from the server 300 has been described, the temperature sensor 136 of the image forming apparatus 102 may obtain the temperature of an environment in which the image forming apparatus 102 is placed.

In step S903, the CPU 121 causes the temperature analysis unit 209 to check whether the temperature information obtained in step S902 indicates a temperature lower than or equal to the minimum utilization temperature 500. If the CPU 121 determines that the temperature information indicates a temperature lower than or equal to the minimum utilization temperature 500 (YES in step S903), the processing proceeds to step S904. If the CPU 121 determines that the temperature information indicates a temperature that is not lower than or equal to the minimum utilization temperature 500 (NO in step S903), the processing proceeds to step S905.

In step S904, the CPU 121 causes a panel input/output control unit 206 to display the warning screen 800 for the user. When the user presses the OK button 801, the processing proceeds to step S905. When the user presses the cancel button 802, the decolorable printing job may be cancelled or suspended. In this case, the warning screen 800 is displayed on the panel input/output control unit 206, but instead may be displayed on a printer driver screen of the data processing apparatus 101. In the case of displaying the warning screen 800 on the printer driver screen, if the image forming apparatus 102 receives a signal indicating that the OK button 801, illustrated in FIG. 8, is pressed in the data processing apparatus 101, the processing proceeds to step S905.

In step S905, the CPU 121 causes the image processing unit 208 to perform decolorable printing via the print engine 112.

In step S906, the CPU 121 causes the image processing unit 208 to perform normal printing via the print engine 112.

In the configuration according to the first exemplary embodiment described above, it is possible to notify the user that there is a possibility that color of decolorable toner can be developed due to a low-temperature environment and the decolored content can be expressed on a sheet to be used for printing. The notification makes it possible to prevent a printed material from being brought into a state unintended by the user.

FIG. 10 illustrates an example of a user notification schedule 1000 for the image forming apparatus 102. In a second exemplary embodiment, a case is described where "17:00 every day" is set as a temperature determination time and a notification about a determination result is transmitted to the user who has executed a job within ten hours from the temperature determination time. This enables the user to recognize in advance that there is a possibility that an image that has been printed and decolored can be expressed, for example, in a utilization situation where the user uses the printed material the next day. The user notification schedule 1000 is stored in the built-in storage unit 130.

FIG. 11 illustrates an example of a job history 1100 for the image forming apparatus 102. A job management number 1101 indicates an identification (ID) for uniquely determining a job. The image forming apparatus 102 allocates the job management number 1101 upon reception of the job. An execution date/time 1102 indicates a date and time when the job is executed. In the example, a job start date/time is set as the execution date/time 1102, but instead a job end time may be set. A user name 1103 indicates a user ID for the user who has input the job and is uniquely determined in the user's environment including the image forming apparatus 102. A job type 1104 indicates a type of job (print job), such as copy, print, and FAX. An execution result 1105 indicates whether the job has normally ended. A decolorable printing 1106 indicates whether the job is a decolorable printing job. The job history 1100 is stored in, for example, the built-in storage unit 130.

Figure 12:
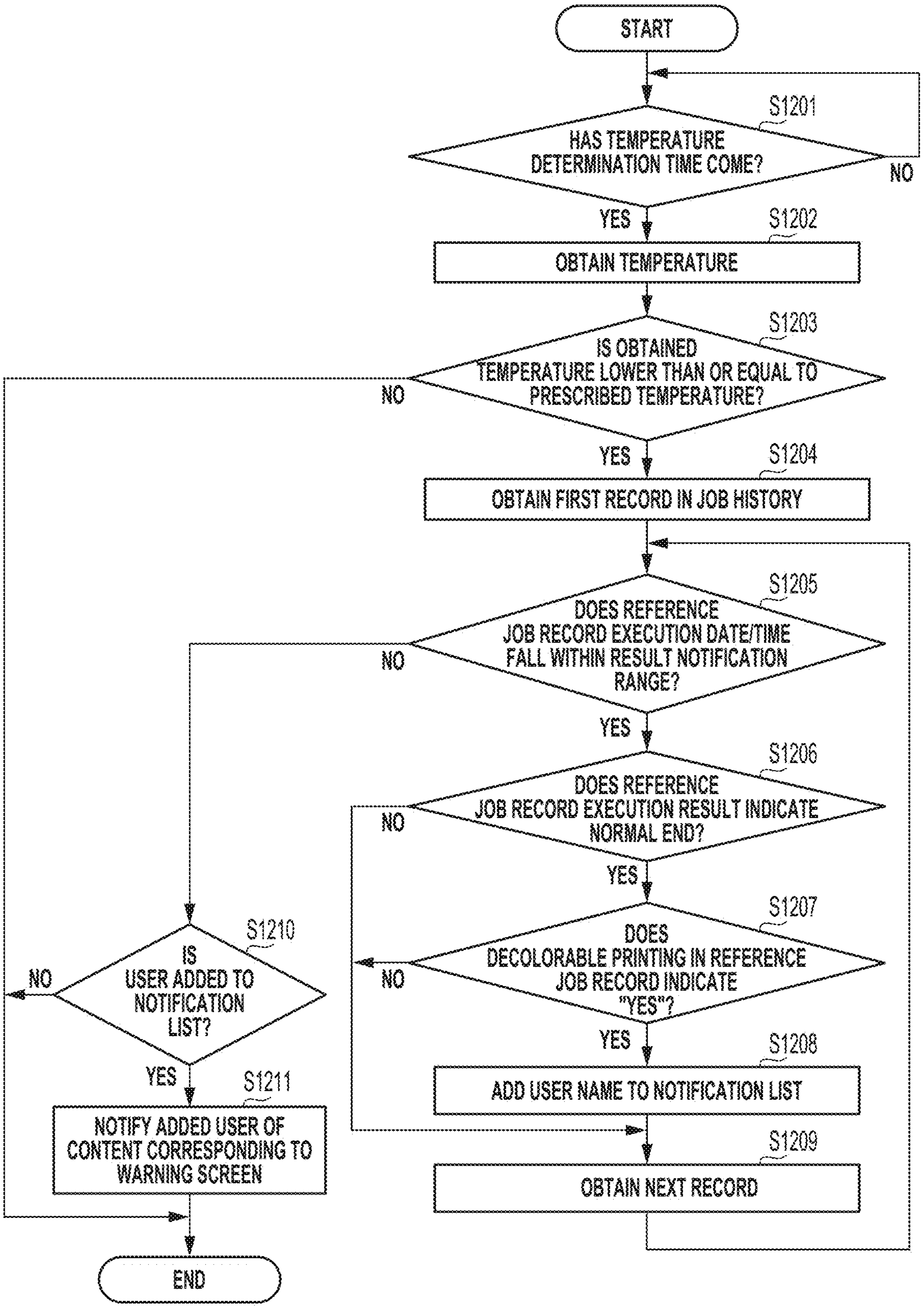
FIG. 12 illustrates an example of a control flowchart for image adjustment and user notification.

FIG. 12 illustrates an example of a control flowchart for obtaining a temperature and notifying the user thereof performed by the image forming apparatus 102. In FIG. 12, the CPU 121 causes the temperature analysis unit 209 to analyze the temperature at a predetermined time set in the schedule for the image forming apparatus 102 and transmit the notification to a user who has executed decolorable printing within a predetermined period of time prior to the predetermined time.

In step S1201, the CPU 121 monitors the schedule and checks whether the temperature determination time has come. If the CPU 121 determines that the temperature determination time has come (YES in step S1201), the processing proceeds to step S1202. If the CPU 121 determines that the temperature determination time has not come (NO in step S1201), the CPU 121 continuously monitors the schedule.

In step S1202, the CPU 121 causes the temperature analysis unit 209 to obtain the temperature on the utilization site. For example, the CPU 121 requests the server 300 to obtain the temperature based on the installation site information 600. The server 300 returns minimum temperature information for the next day in the location indicated by the installation site information 600.

Further, the CPU 121 may obtain temperature information on a plurality of sites based on the take-out destination information 700. As described above, the temperature sensor 136 may obtain the temperature of the environment in which the image forming apparatus 102 is placed.

In step S1203, the CPU 121 causes the temperature analysis unit 209 to check whether the temperature information obtained in step S1202 indicates a temperature lower than or equal to the minimum utilization temperature 500. If the CPU 121 determines that the temperature information indicates a temperature lower than or equal to the minimum utilization temperature 500 (YES in step S1203), the processing proceeds to step S1204. If the CPU 121 determines that the temperature information indicates a temperature that is not lower than or equal to the minimum utilization temperature 500 (NO in step S1203), the processing ends.

In step S1204, the CPU 121 refers to a first record in the job history 1100, i.e., a job record with a job management number "0008" in FIG. 11.

In step S1205, the CPU 121 checks whether the execution date/time 1102 in the job record that has been referred to (reference job record) falls within a result notification range in the user notification schedule 1000. If the execution date/time 1102 falls within the result notification range (YES in step S1205), the processing proceeds to step S1206. If the execution date/time 1102 does not fall within the result notification range (NO in step S1205), the processing proceeds to step S1210.

In step S1206, the CPU 121 checks whether the execution result 1105 in the reference job record indicates a normal end. If the execution result 1105 indicates a normal end (YES in step S1206), the processing proceeds to step S1207. If the execution result 1105 does not indicate normal end (NO in step S1206), the processing proceeds to step S1209.

In step S1207, the CPU 121 determines whether the decolorable printing 1106 in the reference job record indicates "YES". If the CPU 121 determines whether the decolorable printing 1106 in the reference job record is "YES" (YES in step S1207), the processing proceeds to step S1208. If the CPU 121 determines that the decolorable printing 1106 in the reference job record is "NO" (NO in step S1207), the processing proceeds to step S1209.

In step S1208, the CPU 121 adds the user name 1103 in the reference job record to a notification list.

In step S1209, the CPU 121 obtains the next record of the reference job record, and then the processing proceeds to step S1205.

In step S1210, the CPU 121 checks whether a user is added to the notification list obtained in step S1208. If a user is added to the notification list (YES in step S1210), the processing proceeds to step S1211. If no user is added to the notification list (NO in step S1210), the processing ends.

In step S1211, the CPU 121 transmits a notification about a content equivalent to the warning screen 800 to the added user based on the notification list obtained in step S1208. An e-mail is used as a notification method, but instead another method, such as a social networking service (SNS), may be used.

In the configuration according to the second exemplary embodiment described above, it is possible to transmit a notification indicating that there is a possibility that color of decolorable toner can be developed due to a low-temperature environment and the decolored content can be expressed on the printed material to the user who has executed a print job before the scheduled time.

While, in the present exemplary embodiment, a configuration in which a notification is transmitted to the user that has executed a job has been described, a notification may be transmitted to a preliminarily registered administrator.

FIG. 13 illustrates an example of a user notification schedule 1300 for the image forming apparatus 102. In a third exemplary embodiment, a case is described where "every hour from 23:00 to 5:00 (next day) every day" is set as the temperature determination time and a notification about a determination result is transmitted to the user at 8:00. The user notification schedule 1300 is stored in the built-in storage unit 130.

Figure 14:
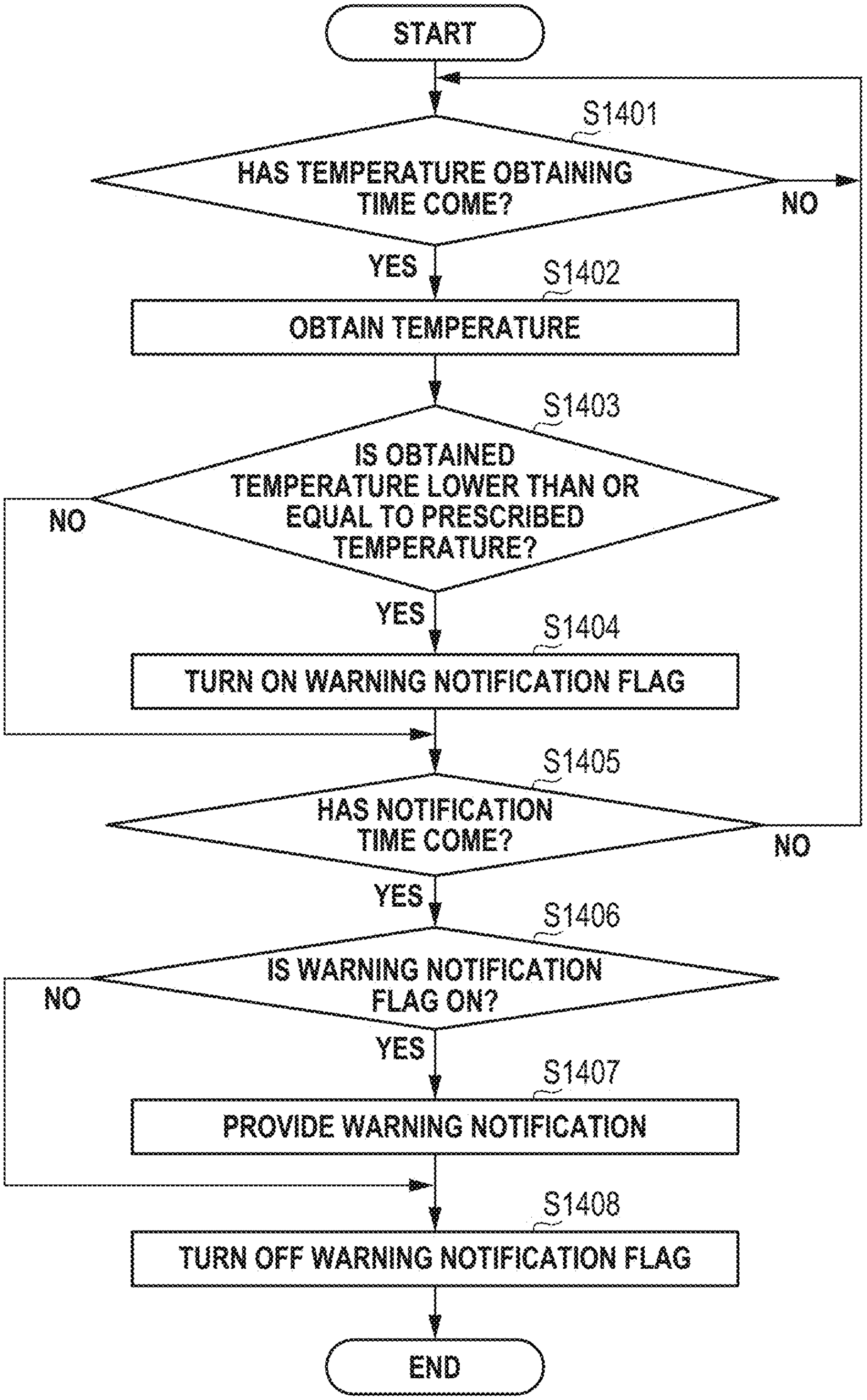
FIG. 14 illustrates an example of a control flowchart for image adjustment and user notification.

FIG. 14 illustrates an example of a control flowchart for obtaining a temperature and notifying the user thereof performed in the main body of the image forming apparatus 102. The CPU 121 causes the temperature analysis unit 209 to analyze the temperature at the scheduled time, and transmits the notification to the user who has executed decolorable printing within a predetermined period of time prior to the scheduled time.

In step S1401, the CPU 121 monitors the schedule and compares the time obtained from the real time clock 134 with a set time in the schedule to thereby check whether a temperature obtaining time has come. If the temperature obtaining time has come (YES in step S1401), the processing proceeds to step S1402. If the temperature obtaining time has not come (NO in step S1401), the CPU 121 continuously monitors the schedule.

In step S1402, the CPU 121 causes the temperature analysis unit 209 to obtain the temperature on the utilization site. For example, the CPU 121 requests the server 300 to obtain the temperature based on the installation site information 600. The server 300 obtains temperature information at that time in a room indicated by the installation site information 600 from the thermometer 302 and returns the temperature information to the image forming apparatus 102.

In step S1403, the CPU 121 causes the temperature analysis unit 209 to check whether the temperature information obtained in step S1402 is lower than or equal to the minimum utilization temperature 500. If the CPU 121 determines that the temperature information indicates a temperature lower than or equal to the minimum utilization temperature 500 (YES in step S1403), the processing proceeds to step S1404. If the CPU 121 determines that the temperature information indicates a temperature that is not lower than or equal to the minimum utilization temperature 500 (NO in step S1403), the processing proceeds to step S1405.

In step S1404, the CPU 121 turns on a warning notification flag. The warning notification flag may be held in any one of the flash ROM 122, the RAM 123, the SRAM 133, and the built-in storage unit 130.

In step S1405, the CPU 121 monitors the schedule and checks whether a user notification time has come. If the CPU 121 determines that the user notification time has come (YES in step S1405), the processing proceeds to step S1406. If the CPU 121 determines that the user notification time has not come (NO in step S1405), the processing returns to step S1401 to continuously monitor the temperature obtaining time.

In step S1406, the CPU 121 checks whether the warning notification flag is on. If the CPU 121 determines that the warning notification flag is on (YES in step S1406), the processing proceeds to step S1407. If the CPU 121 determines that the warning notification flag is off (NO in step S1406), the processing proceeds to step S1408.

In step S1407, the CPU 121 transmits a notification about a content equivalent to the warning screen 800 to a preliminarily registered administrator or a mailing list. An e-mail is used as a notification method, but instead another method, such as an SNS, may be used.

In step S1408, the CPU 121 turns off the warning notification flag.

In the configuration according to the third exemplary embodiment described above, it is possible to notify the user that there is a possibility that color of decolorable toner can be developed due to a low-temperature environment and the decolored content can be expressed on a sheet to be used for printing. The notification makes it possible to prevent a printed material from being brought into a state unintended by the user.

While, in the present exemplary embodiment, a configuration for requesting the server 300 to obtain the temperature information has been described, the temperature information may be obtained from the temperature sensor 136 of the image forming apparatus 102 without involving the server 300.

While, in the present exemplary embodiment, a configuration in which an e-mail is used for a warning notification has been described, a notification may be displayed on the UI panel 111.

A fourth exemplary embodiment is a modification of the first exemplary embodiment. A warning notification method in a case where a received print job includes schedule information will be described with reference to FIG. 21. Steps that are similar to those in FIG. 9 are denoted by the same step numbers, and descriptions thereof are omitted.

Figure 21:
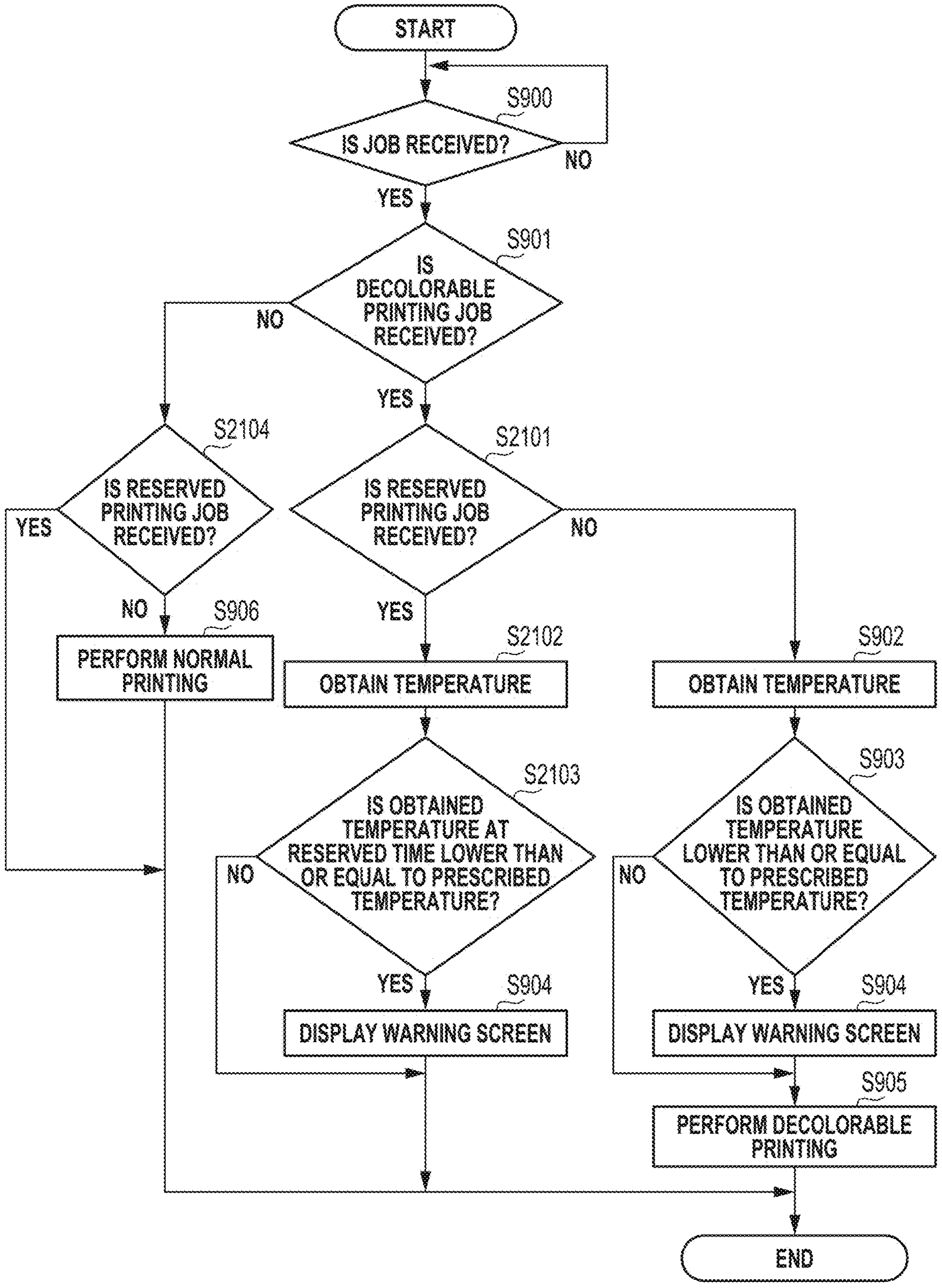
FIG. 21 illustrates an example of a control flowchart for image adjustment and user notification.

The fourth exemplary embodiment will be described with reference to FIG. 21. If the CPU 121 determines that the received print job is a decolorable printing job (YES in step S901), the processing proceeds to step S2101. In step S2101, if the CPU 121 determines that the received print job is not a reserved printing job (NO in step S2101), the processing proceeds to step S902. If the CPU 121 determines that the received print job is a reserved printing job (YES in step S2101), the processing proceeds to S2102. The determination as to whether the received print job is a reserved printing job is made based on whether print job attribute information includes information about a job execution reserved time.

In step S2103, the CPU 121 causes the temperature analysis unit 209 to obtain the temperature at a reserved time on the utilization site. For example, the CPU 121 requests the server 300 to obtain the temperature based on the installation site information 600. The server 300 returns temperature information at the reserved time in the installation site information 600. Further, the CPU 121 may obtain temperature information at the reserved time on a plurality of sites based on the take-out destination information 700.

In step S2103, if the CPU 121 determines that the obtained temperature at the reserved time is not lower than or equal to a threshold temperature (NO in step S2103), the CPU 121 terminates the processing flow. If the CPU 121 determines that the obtained temperature at the reserved time is lower than or equal to the threshold temperature (YES in step S2103), the processing proceeds to step S904. The description of step S904 is omitted.

The description returns to step S901. In step S901, if the CPU 121 determines that the received print job is not a decolorable printing job (NO in step S901), the processing proceeds to step S2104. If the CPU 121 determines that the received print job is a reserved printing job (YES in step S2104), the processing flow ends. If the CPU 121 determines that the received print job is not a reserved printing job (NO in step S2104), the processing proceeds to step S906. The description of step S906 is omitted.

In the configuration according to the fourth exemplary embodiment described above, it is possible to notify the user that there is a possibility that color of decolorable toner can be developed due to a low-temperature environment and the decolored content can be expressed on a sheet to be used for printing in a reserved printing job. The notification makes it possible to prevent a printed material from being brought into a state unintended by the user.

Figure 15:
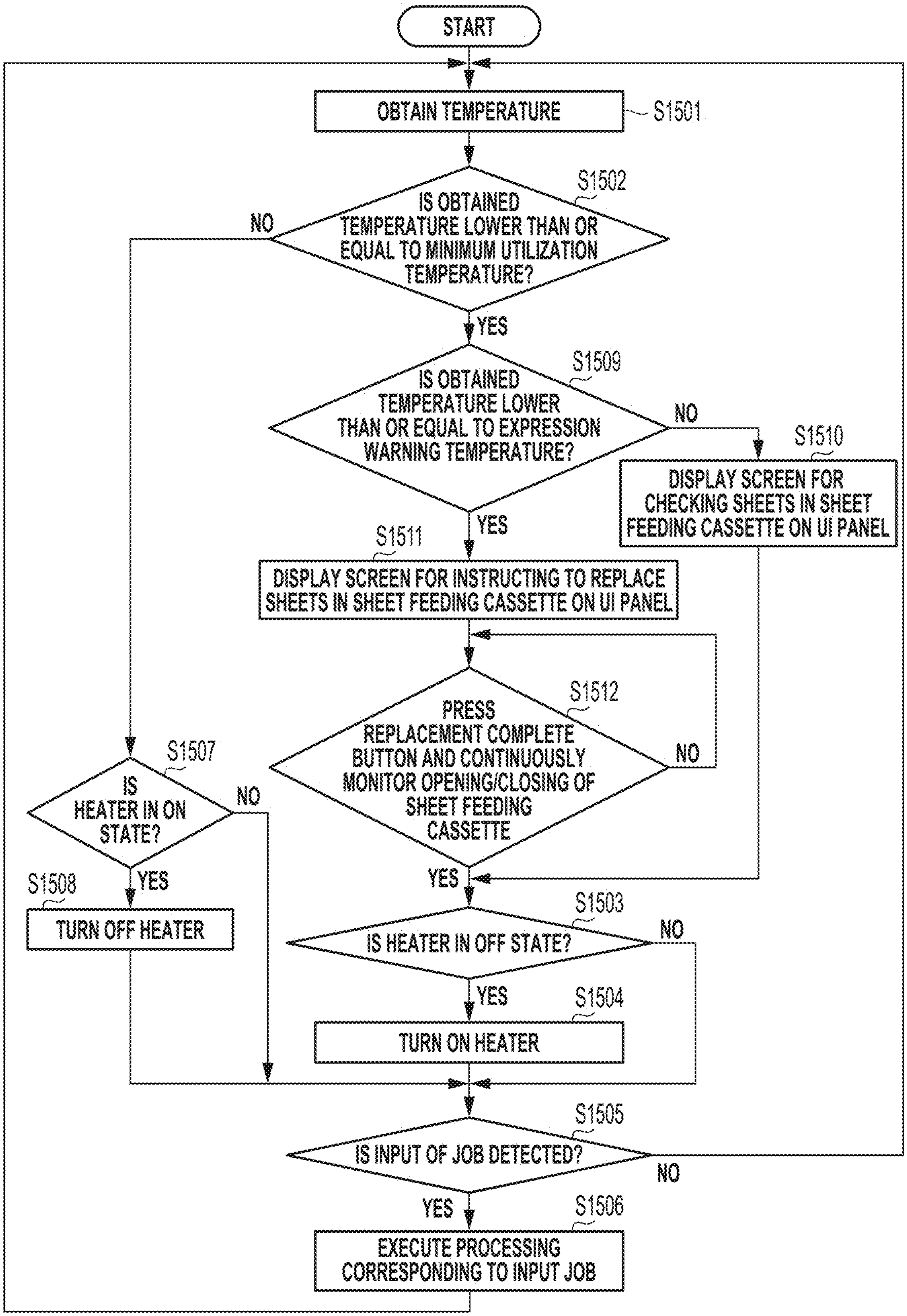
FIG. 15 illustrates an example of a flowchart for image adjustment and heater control.

FIG. 15 illustrates an example of a flowchart for obtaining a temperature and controlling on/off of the heater 116 in the main body of the image forming apparatus 102 according to a fifth exemplary embodiment.

In step S1501, when the user presses the power switch 114, the system of the image forming apparatus 102 is activated. When the image forming apparatus 102 is activated, the CPU 121 obtains a current temperature from the temperature sensor 136. The CPU 121 determines whether the temperature obtained in step S1501 is lower than or equal to the minimum utilization temperature 500. In step S1502, if the CPU 121 determines that the obtained temperature is higher than the minimum utilization temperature 500 (NO in step S1502), the processing proceeds to step S1507. In step S1502, if the CPU 121 determines that the obtained temperature is lower than or equal to the minimum utilization temperature 500 (YES in step S1502), the processing proceeds to step S1509.

In step S1509, the CPU 121 determines whether the temperature obtained in step S1501 is lower than or equal to the expression warning temperature 501. In the processing of step S1509, if the CPU 121 determines that the obtained temperature is lower than or equal to the expression warning temperature 501 (YES in step S1509), the processing proceeds to step S1511. If the CPU 121 determines that the obtained temperature is higher than the expression warning temperature 501 (NO in step S1509), the processing proceeds to step S1510. In step S1510, the CPU 121 displays a screen illustrated in FIG. 20A on the UI panel 111.

Figure 20A:
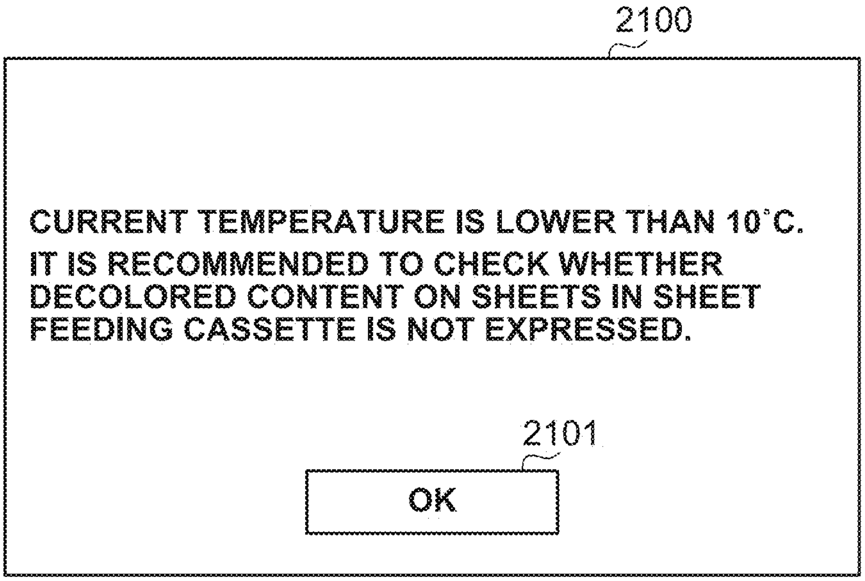
FIGS. 20A and 20B illustrate examples of a user notification screen.

FIG. 20A will now be described. FIG. 20A illustrates a screen to be displayed on the UI panel 111. A display screen 2100 displays information indicating that, for example, "The current temperature is lower than 10° C. It is recommended to check whether the decolored content on sheets in the sheet feeding cassette is not expressed." The screen makes it possible to prompt the user to check whether the decolored content is not expressed on the sheets. The screen can be closed by touching an OK button 2101. The CPU 121 waits for the user to press the OK button 2101 on the UI panel 111, and then the processing proceeds to step S1503.

Figure 20B:
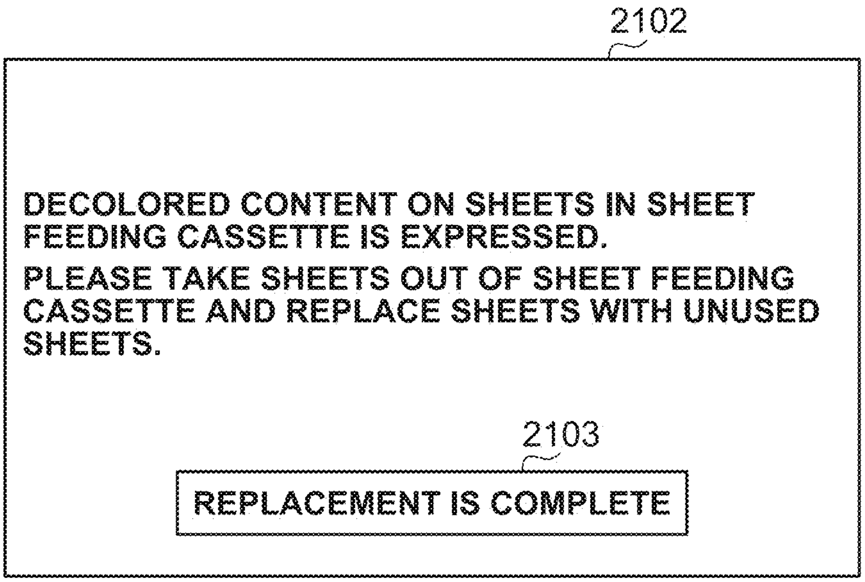

In the processing of step S1511, the CPU 121 displays a screen illustrated in FIG. 20B on the UI panel 111. FIG. 20B will now be described. FIG. 20B illustrates a screen to be displayed on the UI panel 111. A display screen 2102 displays information indicating that, for example, "The decolored content on the sheets in the sheet feeding cassette is expressed. Please take the sheets out of the sheet feeding cassette and replace the sheets with unused sheets." The screen makes it possible to provide the user with a warning that the decolored content is expressed on the sheet. The screen can be closed by touching a replacement complete button 2103. However, if the CPU 121 has not detected opening and closing of the sheet feeding cassette 115, the screen is not closed even when the user presses the replacement complete button 2103.

In step S1512, during a period in which the screen illustrated in FIG. 20B is displayed on the UI panel 111, the CPU 121 continues to monitor pressing of the replacement complete button 2103 and opening and closing of the sheet feeding cassette 115 by the user.

In the processing of step S1512, the CPU 121 continues to perform the display processing of step S1511 until the pressing of the replacement complete button 2103 and the opening and closing of the sheet feeding cassette 115 are detected. If the CPU 121 detects both the pressing of the replacement complete button 2103 and the opening and closing of the sheet feeding cassette 115 (YES in step S1512), the processing proceeds to step S1503.

In the processing of step S1503, the CPU 121 reads a register of the GPIO 129 and determines the on/off state of the heater 116. If the CPU 121 determines that the heater 116 is in the off state (YES in step S1503), the processing proceeds to step S1504. In step S1504, the CPU 121 operates the register of the GPIO 129 to turn on the heater 116. In the determination of step S1503, if the CPU 121 determines that the heater 116 is in the on state (NO in step S1503), the processing proceeds to step S1505.

In the processing of step S1507, the CPU 121 reads the register of the GPIO 129 and determines the on/off state of the heater 116. If the CPU 121 determines that the heater 116 is in the off state (NO in step S1507), the processing proceeds to step S1505.

In the determination of step S1507, if the CPU 121 determines that the heater 116 is in the on state (YES in step S1507), the processing proceeds to step S1508. In step S1508, the CPU 121 operates the register of the GPIO 129 to turn off the heater 116. Then, the processing proceeds to step S1505.

In the processing of step S1505, the CPU 121 waits for an input of a PDL print job or a copy function job. In the determination of step S1505, if the CPU 121 determines that an input of a job is not detected (NO in step S1505), the processing returns to step S1501.

In the determination of step S1505, if the CPU 121 determines that an input of a job is detected (YES in step S1505), the processing proceeds to step S1506. The CPU 121 determines the type of input job in the determination of step S1505, and in the processing of step S1506, the CPU 121 performs PDL printing, copy processing, and the like. In the present exemplary embodiment, detailed descriptions of the PDL printing, copy processing, and the like are omitted.

In the configuration according to the fifth exemplary embodiment described above, it is possible to increase the temperature of the sheet feeding cassette 115 so as to prevent color of decolorable toner from being developed due to a low-temperature environment and prevent the decolored content from appearing on a sheet to be used for printing. The temperature adjustment makes it possible to prevent a printed material from being brought into a state unintended by the user.

In a sixth exemplary embodiment, it is possible to prevent a decolored content on a printed sheet left on a discharge tray from being expressed.

Figure 16:
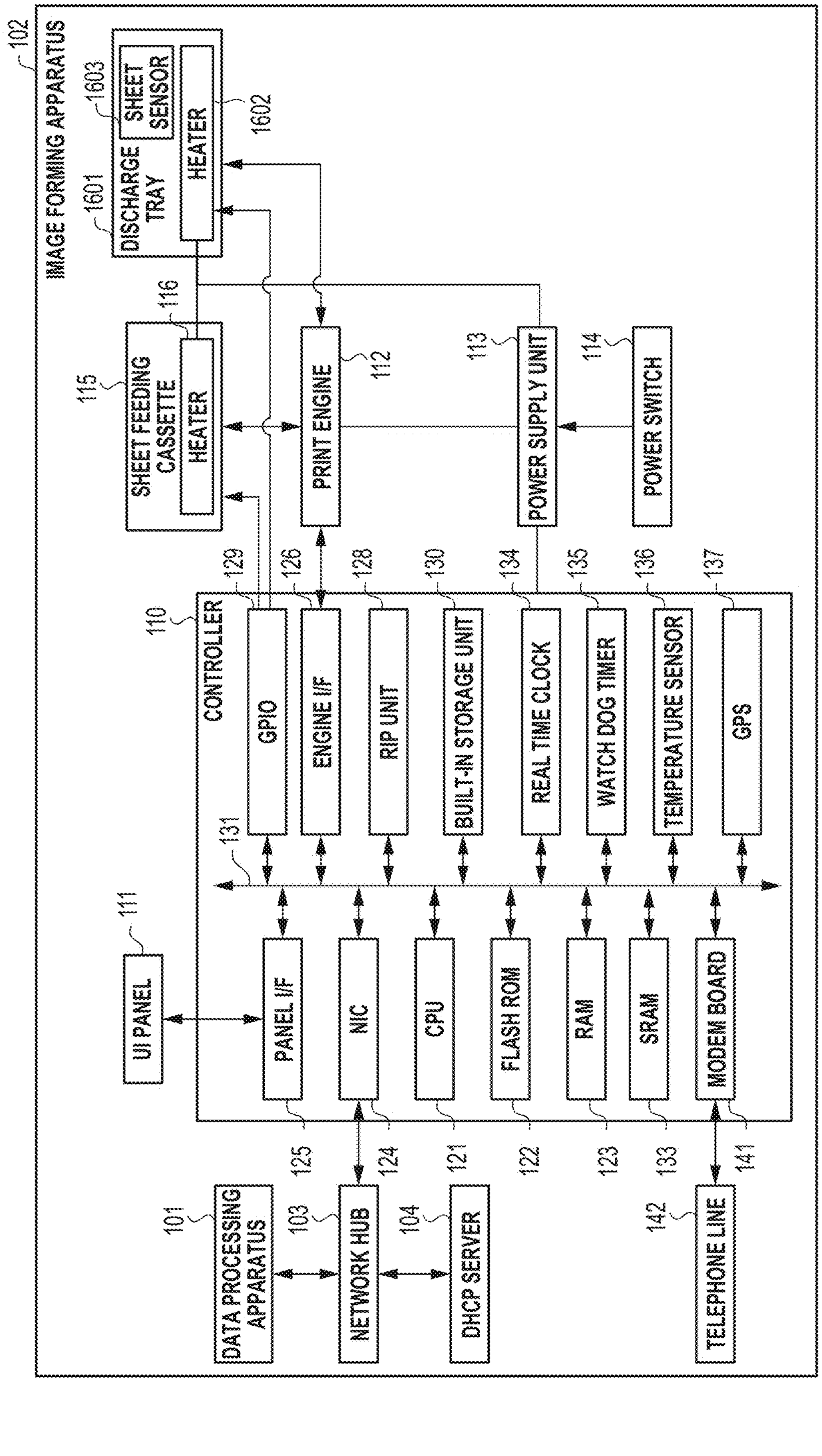
FIG. 16 is a block diagram illustrating a configuration example of an image forming apparatus.

FIG. 16 is a block diagram schematically illustrating a configuration of the image forming apparatus 102 according to the sixth exemplary embodiment. Descriptions of components that have already been described in detail above with reference to FIG. 1 are omitted.

A discharge tray 1601 is a tray onto which a printed sheet to be processed by the image forming apparatus 102 is discharged. The discharge tray 1601 includes a sheet sensor 1603 configured to check whether there is a sheet discharged onto the discharge tray 1601. This enables the CPU 121 to check whether there is a sheet discharged onto the discharge tray 1601. The discharge tray 1601 also includes a heater 1602 configured to keep the sheet warm so as to prevent the decolored print content on the decolored printing sheet from appearing again when the room temperature is expected to drop to a temperature lower than or equal to a predetermined temperature.

Power is supplied to the heater 1602 via a line of a system different from that of the print engine 112. Controlling of activation and stopping of the heater 1602 is performed under control of the CPU 121 via a line using the GPIO 129.

Figure 17:
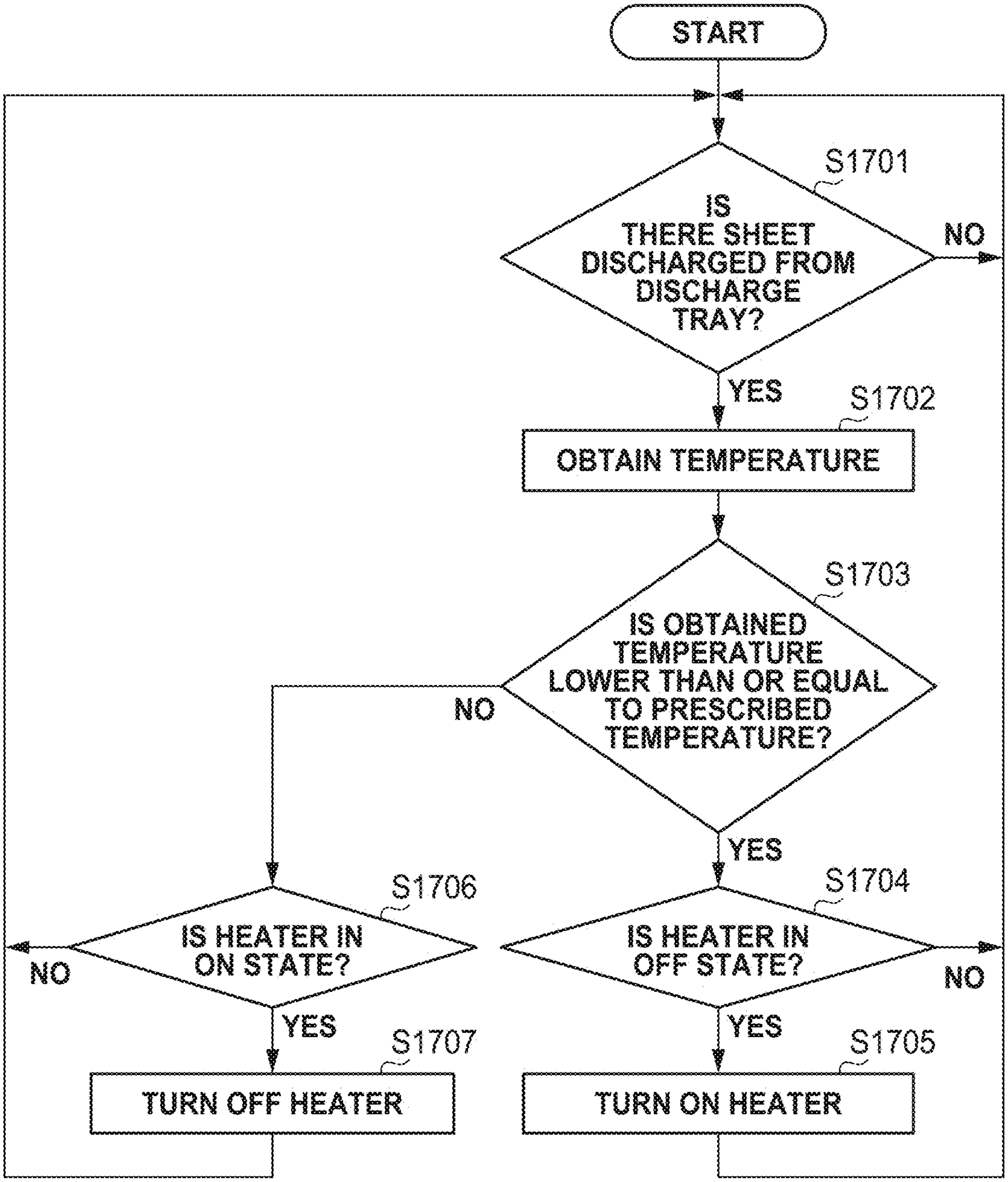
FIG. 17 illustrates an example of a flowchart for image adjustment and heater control.

FIG. 17 illustrates an example of a flowchart for obtaining a temperature and controlling on/off of the heater 1602, which is located on the discharge tray 1601, in the main body of the image forming apparatus 102.

When the user presses the power switch 114, the system of the image forming apparatus 102 is activated. When the image forming apparatus 102 is activated in step S1701, the CPU 121 obtains, from the sheet sensor 1603, information indicating whether there is a sheet discharged onto the discharge tray 1601. In the determination of step S1701, if the CPU 121 determines that there is no discharged sheet (NO in step S1701), the processing returns to step S1701. In the determination of step S1701, if the CPU 121 determines that there is a discharged sheet (YES in step S1701), the processing proceeds to step S1702. In step S1702, the CPU 121 obtains the current temperature from the temperature sensor 136. In step S1703, the CPU 121 determines whether the temperature obtained in step S1702 is lower than or equal to the minimum utilization temperature 500.

In the determination of step S1703, if the CPU 121 determines that the obtained temperature is lower than or equal to the minimum utilization temperature 500 (YES in step S1703), the processing proceeds to step S1704. In the determination of step S1703, if the CPU 121 determines that the obtained temperature is higher than the minimum utilization temperature 500 (NO in step S1703), the processing proceeds to step S1706.

In the processing of step S1704, the CPU 121 reads the register of the GPIO 129 and determines the on/off state of the heater 1602. In the determination of step S1704, if the CPU 121 determines that the heater 1602 is in the off state (YES in step S1704), the processing proceeds to step S1705. In the processing of step S1705, the CPU 121 operates the register of the GPIO 129 to turn on the heater 1602, and then the processing returns to step S1701. In the determination of step S1704, if the CPU 121 determines that the heater 1602 is in the on state (NO in step S1704), the processing returns to step S1701.

In the determination of step S1703, if the CPU 121 determines that the obtained temperature is higher than the minimum utilization temperature 500 (NO in step S1703), the processing proceeds to step S1706.

In the determination of step S1706, the CPU 121 reads the register of the GPIO 129 and determines the on/off state of the heater 1602. In the determination of step S1706, if the CPU 121 determines that the heater 1602 is in the on state (YES in step S1706), the processing proceeds to step S1707. In the processing of step S1707, the CPU 121 operates the register of the GPIO 129 to turn off the heater 1602, and then the processing returns to step S1701.

In the determination of step S1706, if the CPU 121 determines that the heater 1602 is in the off state (NO in step S1706), the processing returns to step S1701. In the configuration according to the sixth exemplary embodiment described above, it is possible to increase the temperature of the discharge tray 1601 so as to prevent color of decolorable toner from being developed due to a low-temperature environment and prevent the decolored content from appearing on a printed material. The temperature adjustment makes it possible to prevent the printed material from being brought into a state unintended by the user.

Figure 18:
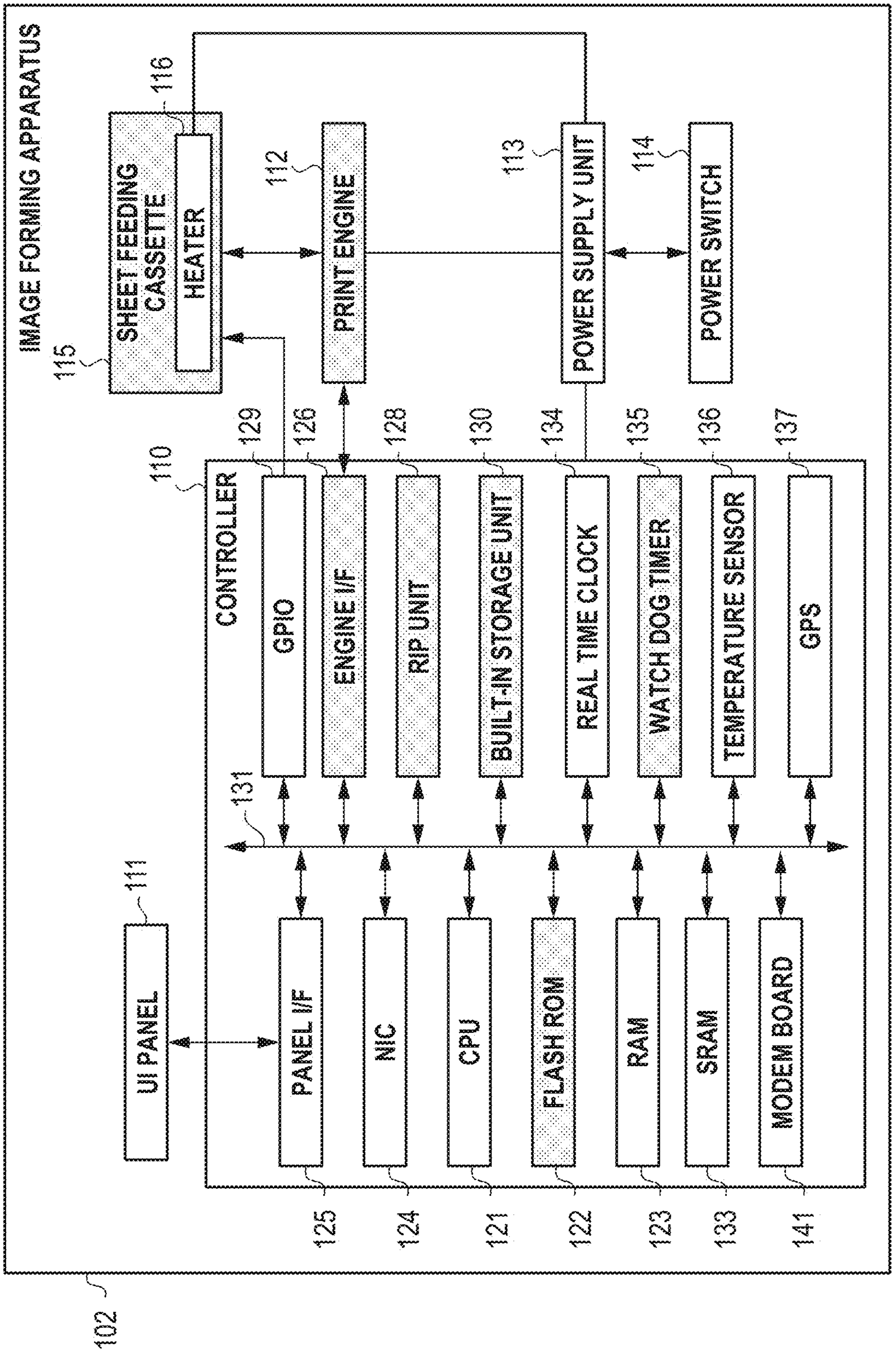
FIG. 18 is a block diagram illustrating a power-saving state of the image forming apparatus.

In a seventh exemplary embodiment, power saving for the image forming apparatus 102 and power control for the heater 116 will be described. FIG. 18 illustrates an example of a power-saving state of the image forming apparatus 102. Each block with a non-colored background area (e.g., the CPU 121) indicates a component in an energized state, and each block with a colored background area (e.g., the print engine 112) indicates a component in a disconnected state. In a standby state (not illustrated), each block illustrated in FIG. 18 enters the energized state.

In the power-saving state, the image forming apparatus 102 can receive only an input of data from the data processing apparatus 101 and an input of a job through an operation on the UI panel 111 by the user. The supply of power to a block not required for the detection thereof is blocked.

As illustrated in FIG. 18, even in the power-saving state, the UI panel 111, the panel I/F 125, and the NIC 124, which are used to receive a job, are each represented as the block with a white background area and thus are in the energized state. Even in the power-saving state, the temperature sensor 136 is in the energized state. This enables the CPU 121 to read information from the temperature sensor 136 when a temperature drop or temperature information is detected, and to control the GPIO 129 and the on/off state of the heater 116 via a line.

A power system for the heater 116 can be supplied with power via the print engine 112. Power can be supplied to the heater 116 from the power supply unit 113 so that the on/off state of the heater 116 can be controlled even in the power-saving state. A communication system for the heater 116 is configured to be supplied with power via the print engine 112. A line for the communication system is directly connected to the heater 116 from the GPIO 129 located in the controller 110 so that the on/off state of the heater 116 can be controlled even in the power-saving state.

Figure 19:
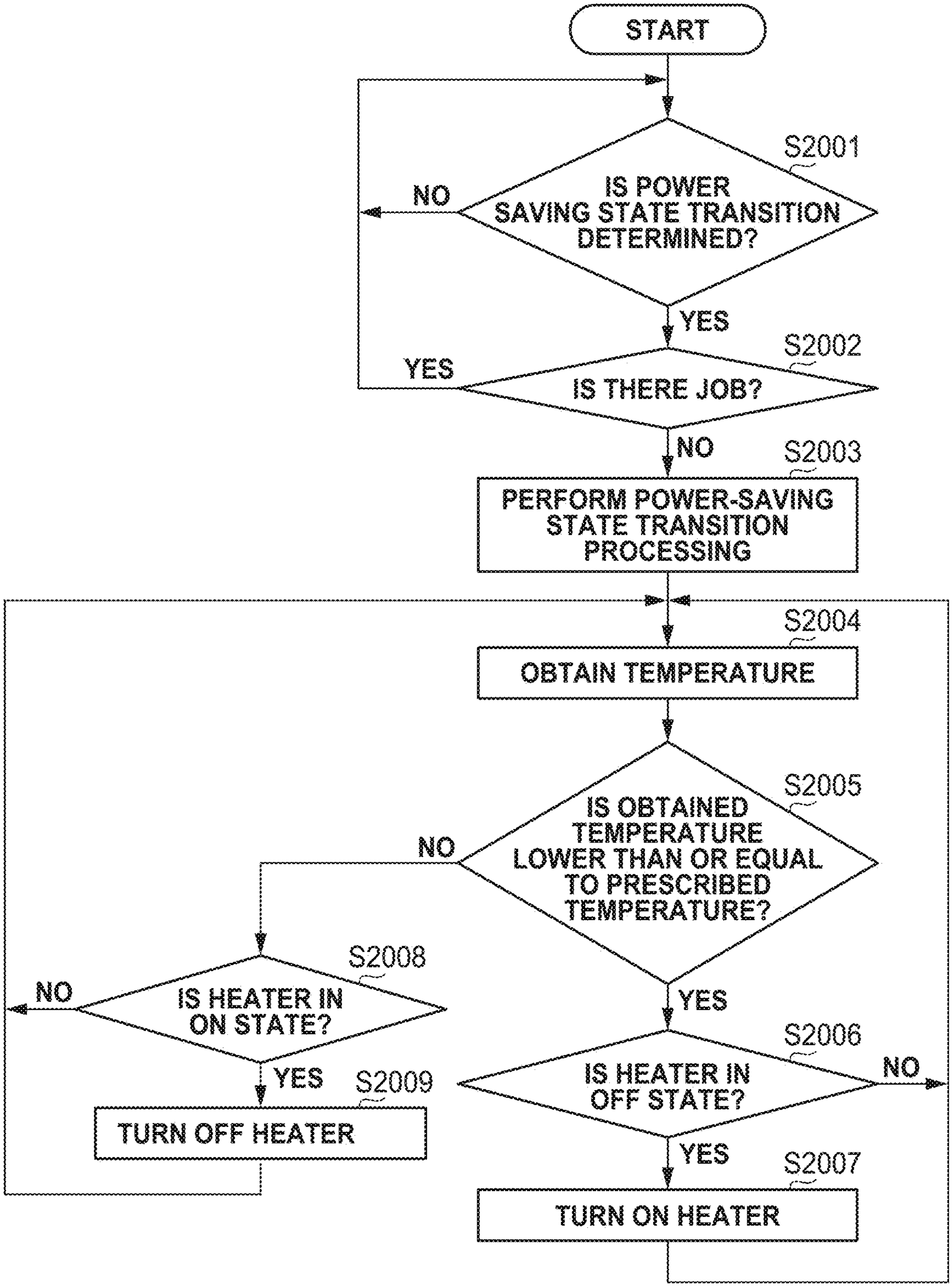
FIG. 19 illustrates an example of a flowchart for image adjustment and heater control.

FIG. 19 illustrates an example of a flowchart for transitioning to the power-saving state, obtaining a temperature in the power-saving state, and controlling on/off of the heater 116 in the main body of the image forming apparatus 102.

Since FIG. 19 illustrates the flowchart for controlling on/off of the heater 116 in the power-saving state, the description of a step associated with the reception of a job in the power-saving state is omitted.

The flowchart is started from the standby state where all blocks of the image forming apparatus 102 are energized.

In step S2001, the CPU 121 performs power-saving state transition determination based on a criterion set in the image forming apparatus 102. The power-saving state transition determination is performed based on an elapsed time from the reception of a last job in the image forming apparatus 102. If the CPU 121 determines that the elapsed time has not reached the criterion (NO in step S2001), the CPU 121 repeatedly performs the determination in step S2001. If the CPU 121 determines that the elapsed time has reached the criterion (YES in step S2001), the processing proceeds to step S2002.

In step S2002, the CPU 121 checks whether there is a job immediately before power-saving state transition processing is executed. If the CPU 121 recognize generation of a job (YES in step S2002), the processing returns to step S2001. If the CPU 121 does not recognize generation of a job (NO in step S2002), the processing proceeds to step S2003.

In step S2003, the CPU 121 performs the power-saving state transition processing on blocks each with a gray background area illustrated in FIG. 18, and brings the blocks into the power-saving state.

In step S2004, when the image forming apparatus 102 is in the power-saving state, the CPU 121 is periodically awakened, and the temperature sensor 136 obtains a current temperature. In step S2005, the CPU 121 determines whether the obtained temperature is lower than or equal to the minimum utilization temperature 500 based on the temperature obtained in the processing of step S2004. In the determination in step S2005, if the CPU 121 determines that the obtained temperature is lower than or equal to the minimum utilization temperature 500 (YES in step S2005), the processing proceeds to step S2006. If the CPU 121 determines that the obtained temperature is higher than the minimum utilization temperature 500 (NO in step S2005), the processing proceeds to step S2008.

In the processing of step S2006, the CPU 121 reads the register of the GPIO 129 and determines the on/off state of the heater 116. If the CPU 121 determines that the heater 116 is in the off state (YES in step S2006), the processing proceeds to step S2007. In step S2007, the CPU 121 operates the register of the GPIO 129 to turn on the heater 116. In the determination of step S2006, if the CPU 121 determines that the heater 116 is in the on state (NO in step S2006), the processing returns to step S2004.

In the processing of step S2008, the CPU 121 reads the register of the GPIO 129 and determines the on/off state of the heater 116. If the CPU 121 determines that the heater 116 is in the off state (NO in step S2008), the processing returns to step S2004. In the determination of step S2008, if the CPU 121 determines that the heater 116 is in the on state (YES in step S2008), the processing proceeds to step S2009. In step S2009, the CPU 121 operates the register of the GPIO 129 to turn off the heater 116. Then, the processing returns to step S2004.

The temperature obtaining in step S2004 is periodically performed as described above. For example, the temperature obtaining is performed every hour. A time interval at which the temperature obtaining is performed may be settable by the user.

In the configuration according to the seventh exemplary embodiment described above, it is possible to increase the temperature in the sheet feeding cassette 115 so as to prevent the decolored content from appearing on a printed material due to a low-temperature environment. The temperature adjustment makes it possible to prevent the printed material from being brought into a state unintended by the user.

While various examples and exemplary embodiments of the present disclosure have been described above, the intent and scope of the present disclosure are not limited to any specific descriptions in the present specification.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-134575, filed Aug. 22, 2023, which is hereby incorporated by reference herein in its entirety.

What is claimed is:

1. An image forming system including an image forming apparatus including a reception unit configured to receive a decolorable printing job to execute decolorable printing processing using a decolorable recording material on which a decolored character is to be expressed at a temperature lower than a predetermined temperature, the image forming system comprising:

a notification unit configured to provide information; and a controller configured to obtain temperature information, wherein, in a case where the decolorable printing job is executed, the notification unit provides a notification of a warning against execution of the decolorable printing job based on the temperature information indicating a temperature at which the decolored character can be expressed.

2. The image forming system according to claim 1, wherein the warning is a warning for notifying a user of a state where the decolored character can be expressed.

3. The image forming system according to claim 1, wherein the warning is issued in a case where the decolorable printing job using a sheet on which a print content formed with the recording material is decolored in advance is executed.

4. The image forming system according to claim 1, wherein the warning includes a first key configured to at least execute the decolorable printing job.

5. The image forming system according to claim 1, wherein the warning includes a second key configured to at least cancel execution of the decolorable printing job.

6. The image forming system according to claim 1, wherein the controller compares the temperature information with a threshold temperature, and wherein the notification unit provides the notification of the warning against the execution of the decolorable printing job based on the temperature information indicating a temperature lower than the threshold temperature, or the temperature information indicating a temperature lower than or equal to the threshold temperature.

7. The image forming system according to claim 1, wherein the image forming apparatus further includes a temperature sensor configured to measure a temperature, and wherein the controller obtains the temperature information from the temperature sensor installed on the image forming apparatus.

8. The image forming system according to claim 1, further comprising an information processing apparatus configured to communicate with the image forming apparatus, wherein the temperature information is information based on a weather forecast obtained from the information processing apparatus.

9. The image forming system according to claim 8, further comprising an information processing apparatus configured to communicate with the image forming apparatus via a network and to transmit the decolorable printing job, wherein the notification unit is included in the information processing apparatus, and the information processing apparatus provides the notification of the warning based on transmission of the decolorable printing job to the image forming apparatus.

10. The image forming system according to claim 1, wherein the notification unit is included in the image forming apparatus.

11. The image forming system according to claim 1, wherein the decolorable printing job is a copy job.

12. The image forming system according to claim 1, wherein the decolorable printing job is a facsimile (FAX) job.

13. The image forming system according to claim 1, wherein the image forming apparatus further includes a storage configured to store information indicating time when the decolorable printing job is executed and a name of a user who has executed the decolorable printing job, wherein the controller obtains the temperature information at a predetermined time, and wherein the notification unit transmits a notification of a warning to a user who has executed the decolorable printing job prior to the predetermined time.

14. The image forming system according to claim 1, wherein, in a case where the decolorable printing job includes time information for reservation of execution, the controller obtains the temperature information based on the time information.

* * * * *